Nov. 26, 1935.　　　　E. S. PORTER　　　　2,022,362
AMATEUR MOTION PICTURE CAMERA
Filed June 16, 1931　　　3 Sheets-Sheet 1

INVENTOR
Edwin S. Porter.
BY his ATTORNEYS

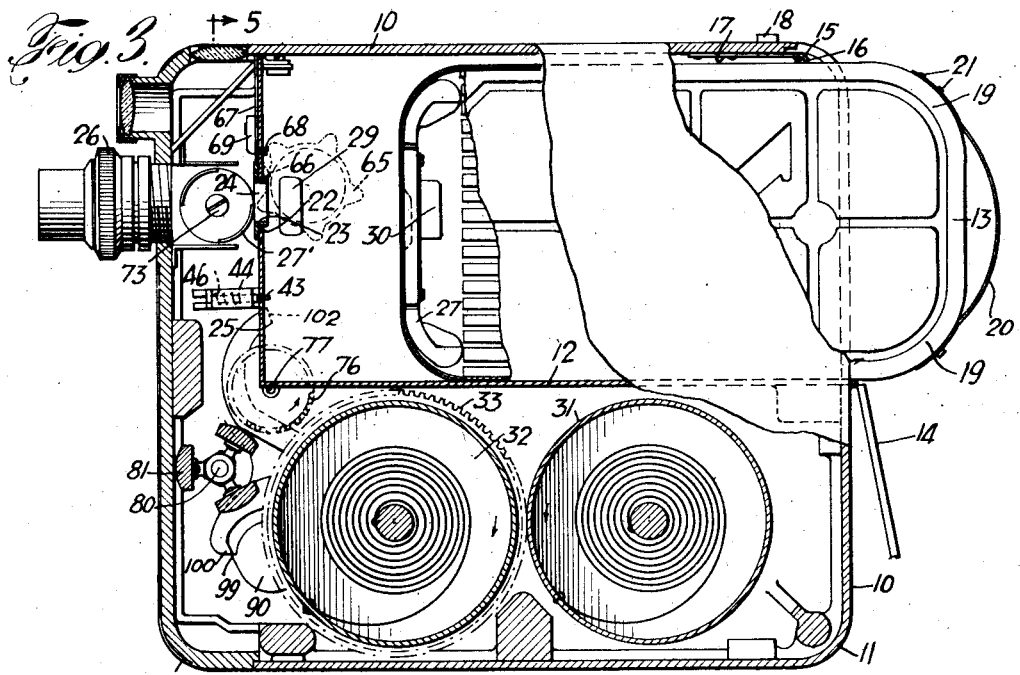

Nov. 26, 1935.  E. S. PORTER  2,022,362
AMATEUR MOTION PICTURE CAMERA
Filed June 16, 1931   3 Sheets-Sheet 3
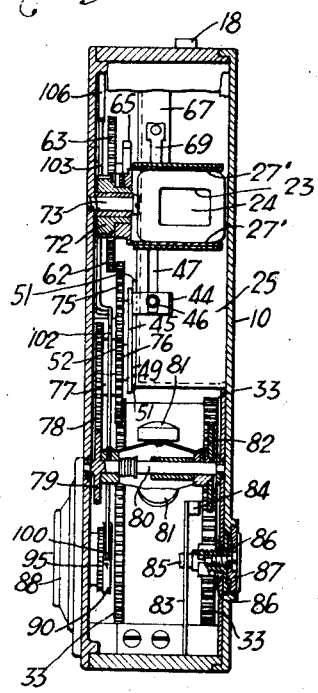
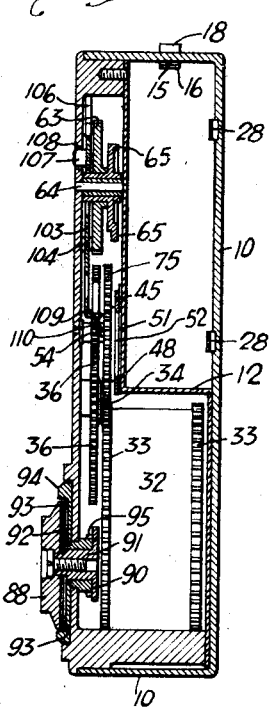
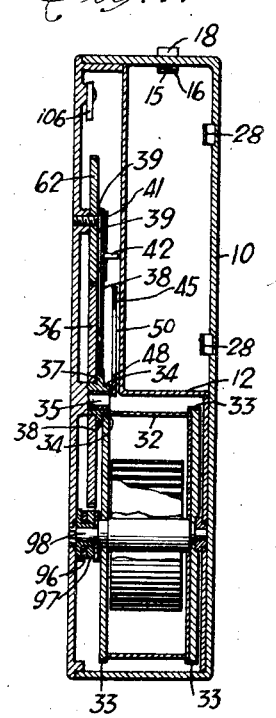
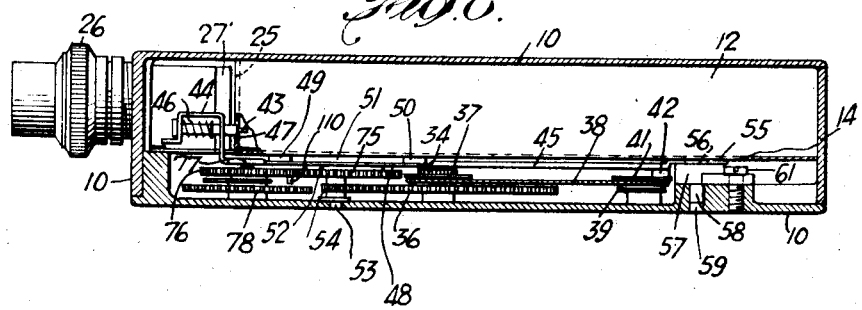
INVENTOR
Edwin S. Porter.
BY his ATTORNEYS Patented Nov. 26, 1935

2,022,362

UNITED STATES PATENT OFFICE 2,022,362

AMATEUR MOTION PICTURE CAMERA

Edwin Stanton Porter, New York, N. Y.

Application June 16, 1931, Serial No. 544,752

7 Claims. (Cl. 88—18)

This invention relates to motion picture cameras and has particular reference to amateur motion picture cameras. This application discloses an improvement on my co-pending application Ser. No. 464,739 filed June 30, 1930 entitled "Motion picture cameras".

One of the main objects of the invention is to provide an improved motion picture camera which is more simple in construction, is compact, and is efficient in operation.

A further object is to provide a novel construction of camera which will permit only definite predetermined types of film magazine to be inserted therein, and which will automatically prevent insertion of any other magazine than the right kind, as well as the absolutely accurate longitudinal and lateral alignment of the proper magazine when it is inserted.

A further object is to provide simple and efficient means whereby the proper magazine when inserted may be quickly and easily withdrawn and whereby the door closing the magazine chamber may be readily operated and will assist when closed in holding the magazine in proper position.

Still a further object is to provide simple and efficient means whereby the stopping of the driving mechanism may be controlled with accuracy and to a fine degree by setting an element or dial on the outside of the camera casing so that only a predetermined length of film will pass the aperture and then the camera operation will be automatically stopped.

A still further object is to provide an operating button which may be moved in one direction to take a single exposure, or moved in another direction to cause a continuous operation of the camera under control of the improved footage regulator.

A further object is to provide improvements in the film feeding claw and in the construction and operation of the film registration pin which is operative when the claw is not feeding the film.

Further and more specific objects, features and advantages will more clearly appear from a consideration of the specification hereinafter taken in connection with the accompanying drawings which form part of the specification and which illustrate a present preferred form of the invention.

Briefly considered the invention includes a camera casing having a magazine receiving chamber into which a compact film magazine is insertable when the chamber door is opened. As the magazine is inserted to proper position cooperating ribs and sections on the magazine and the camera chamber register with each other to permit the magazine to be moved to its final and proper picture taking position. Unless the magazine is provided with one of these cooperating registering means it cannot be inserted to take pictures. Preferably lateral springs in the chamber assist in keeping the magazine in alignment with the aperture in the chamber which is in axial alignment with the lens of the camera. Means such as a spring on the door or on the camera tend to press the magazine forward longitudinally to hold it in this proper position. The film magazine is provided with amply and widely grooved corners. This is for the purpose of having smooth appearance permitting its ready insertion in the pocket of the user and permitting smooth entrance and exit, but also is to provide plenty of clearance at the rear of the chamber to permit absolute and accurate operation of the latch member which releases the chamber door. The spring on the rear of the camera when the door is released permits the camera to be readily pulled out by the fingers of the operator grasping the spring.

The invention further includes a spring drive motor operating a centrifugal device which is associated with a movable brake arm the position of which may be adjusted by its connection with a dial operating mechanism on the outside of the camera casing. The setting of this dial determines the position of the brake to permit it to operate at certain maximum speeds whereby the speed of the film feeding can be controlled.

A further feature of the invention includes a simple starting and stopping lever operated by a button projecting through the casing. When the button is moved in one direction certain stops of this lever are disposed in line with the movement of a projection on one of the drive gears or a part of the driving mechanism to permit the drive to move one section or exposure of the film into position in front of the aperture opening, after which the mechanism is stopped. On the other hand movement of the button in another direction will move the stop member on the lever entirely from the path of any projection or stop elements on the drive mechanism and will thereby permit the continuous movement of the drive mechanism for continuous feeding of the film.

The invention further includes a stop cam operated continuously whenever the spring motor is driving the film. This cam having at least one high point and being adjustable by means of a dial on the outside of the casing. Within the camera this stop cam is associated with a stop lever. This stop lever is operated at a desired point in the travel of the cam, depending upon the setting of the cam, and as it is guided by the cam this stop lever engages the portion of the starting lever above-mentioned to move it to position where this stop element is in line with the movement of the stop element or projection on the drive mechanism to stop the drive. By setting the dial on the outside of the casing to indicate the number of feet of film to be exposed before automatic stopping thereof, the high point of the stop cam is set in a definite position. This cam is operated slowly and in conjunction with the number of feet of film passing the aperture in the camera. As the desired footage has been passed the high point reaches and guides the stop lever which causes the automatic stopping of the drive.

The invention further includes an improved claw operating member to give a simple effective path of travel with respect to the film and provided with means for ready adjustment so that its path and throw can be finely adjusted.

A further feature includes a simple and efficient cam operating with a registration pin to effectively operate the pin with minimum function and disturbance so as to hold the film accurately and positively when the claw is not feeding the same.

The preferred present form of the invention is shown in the drawings, of which:

Fig. 3 is a view similar to Fig. 1 with the magazine partly removed from its recess and showing more in detail the power driving mechanism;

Fig. 4 is a vertical longitudinal section through the operating mechanism taken on the line 4—4 of Fig. 5;

Fig. 5 is a vertical cross-section taken on the line 5—5 of Fig. 3;

Fig. 6 is a similar section taken on the line 6—6 of Fig. 4;

Fig. 7 is a similar section taken on the line 7—7 of Fig. 4; and

Fig. 8 is a horizontal section taken on the line 8—8 of Fig. 4.

Figure 1:
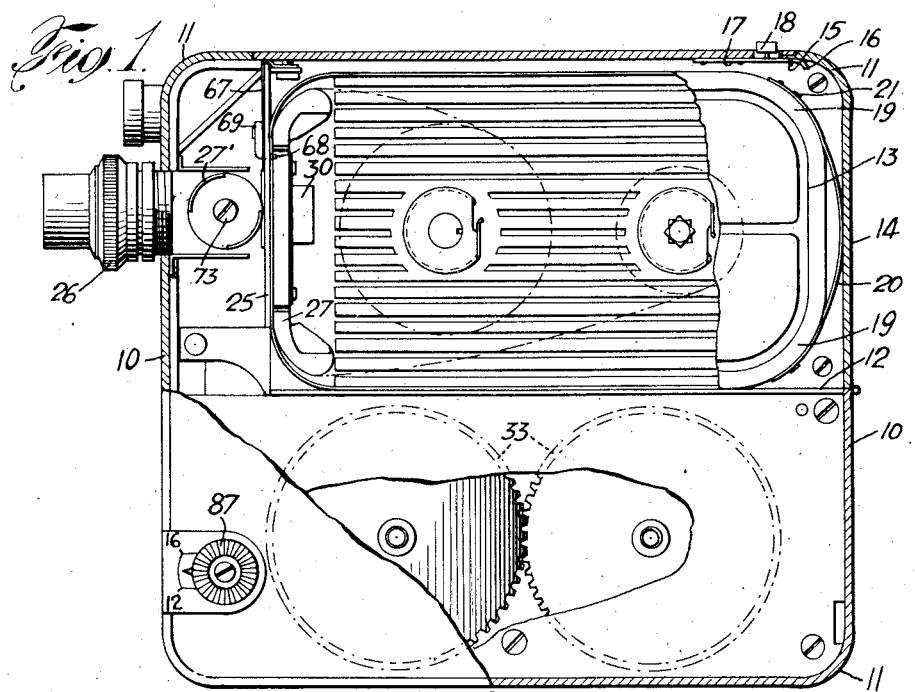
Fig. 1 is a side elevation of the camera with the cover plate broken away showing the film magazine in position within its recess and with a part of the magazine broken away.

The preferred form of the camera shown in the drawings, comprises a substantially rectangular-shaped casing 10, relatively narrow in depth and having fairly ample curved corners 11. Within this casing 10 there is formed a rectangular shaped chamber 12 which is the chamber for receiving a film magazine 13. This chamber preferably is made accessible by means of a pivoted door 14 at the rear of the camera. This door at its free end is provided on its inner face with a pin 15. As the door is moved to the closed position shown in Fig. 1 this pin 15 engages the bevelled or sloping end 16 of a leaf spring 17 fastened to the inner wall of the chamber 12. This spring is provided with a suitable hole to receive the pin when the door is closed to lock the door. The spring 17 is released by depressing a button 18 which is fastened to the spring and projects upwardly through the wall of the camera. Thus, the door may be snapped shut and will automatically be locked.

It will be noted from Fig. 1 that the magazine 13 has rounded corners 19 the radii of which are preferably greater than the corner radii of the camera casing 10. Therefore, the adjacent surface of the magazine 13 when disposed within the chamber 12 falls away from the wall of the chamber 12 especially in the vicinity of the door latch just described. By the provision of this construction it is possible to operate the button 18. If the wall of the magazine were straight at this point and lay too close to the latch member, it would be impossible to open the door and remove the magazine. For this reason only certain types of magazines can be used with the camera and this prohibitory construction will prevent the use of unauthorized magazines.

It will also be noticed that at the back of the magazine 13 there is disposed a curved spring 20 which is preferably fastened rigidly by rivets 21 at one end and is slidably connected to the magazine at the other. The nature of this spring is such that when the door 14 is closed the spring will bear thereagainst and assist in holding the front end of the magazine in proper picture taking position with the aperture opening 22 snugly engaged with a flange or frame 23 of the opening 24 in the wall 25 which is the front wall of the magazine chamber 12. This front wall is provided with the opening 24 designed and constructed to be at exactly the right distance from the lens combination 26. The free edges of the flange 23 projecting into the aperture opening 22 engage the film within the magazine which film is disposed and passes in front of the fixed guide plate 27 within the magazine. This arrangement permits the film to be moved but insures that that portion of it which passes across the optical axis will be exactly in the right plane with respect to the shutter 27' and the lens combination 26.

Figure 2:
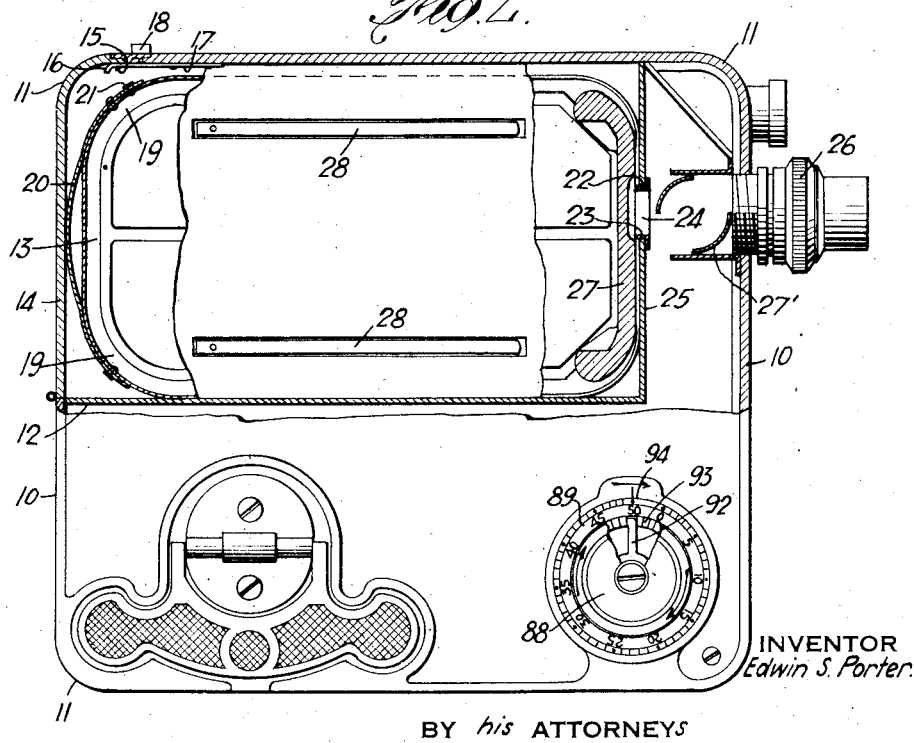
Fig. 2 is a similar elevation of the opposite side of the camera.

In Figs. 2, 6 and 7 there are seen elongated springs 28 disposed against the side wall of the magazine chamber 12 to bear against the side of the magazine 13 and assist in holding the magazine within the recess on chamber 12. Thus it will be seen that the magazine by reason of these springs 28 and the springs 20 is resiliently but firmly held in longitudinal and lateral position and alignment. Any suitable type of magazine holding means may be employed to accomplish the above location of the magazine. However, the above means are satisfactory so long as the flange or frame 23 extends into the aperture of the magazine and engages the film. With this arrangement of parts it will be noted that the magazine may be slightly movable without destroying the picture taking position. In Fig. 3 the one side wall of the chamber 12 is shown provided with a projecting rib 29 adjacent the aperture 24. The rib is adapted to register with the corresponding groove 30 in the adjacent wall of the magazine, when the magazine is received into the chamber 12. By means of this proper registration only the properly constructed magazine can be completely inserted in this chamber as otherwise groove 30 would not register with projection 29 thereby preventing the magazine from being moved into proper focal or picture taking position.

The power operation of the machine and the necessary elements therefor are shown in elevation in Figs. 3 and 4, in which are shown the two motor spring casings 31 and 32 preferably geared together for series operation. Gear 33 on the spring motor casing 32 meshes with a pinion 34 on a shaft 35. This shaft 35 carries a large gear 36 and a belt pulley 37 over which a spring belt 38 is disposed. This spring belt is preferably in the form of a tightly coiled spring and extends over the pulley 39 mounted on shaft 40 which also carries a drive plate 41 on which is disposed a driving pin 42. This pin is adapted to engage with a driving disk or gear, not shown, disposed on the outside of the film magazine to rotate the film-take-up spool within the magazine.

The film in the magazine is adapted to be engaged by a claw or pin 43 mounted slidably on the curved offset end 44 of a claw arm 45. This pin is engaged by a suitable spring 46 which tends to move it forward against the film at all times. The pin is adapted to enter a slot 47 in the front wall of the magazine chamber 12 as shown in Figs. 5 and 8, so as to engage with the holes in the side of the film. Adjacent this front end the claw 45 is provided with an offset portion 48 to form a rectangular shaped opening between it and the main portion of the arm. Laterally disposed flanges 49 and 50 on this offset portion are disposed in spaced relation and receive therebetween a cam 51. A similar cam 52 is disposed to ride in the rectangular opening between the main arm 45 and the offset portion 48. These two cams are both mounted on a shaft 53 which carries a pinion 54 meshing with the gear 36. The cam 51 is adapted to move the claw arm 45 reciprocally back and forth and the cam 52 is adapted to move the claw arm 45 reciprocally up and down. The design of these cams is such that the claw 43 moves in a substantially rectangular orbit first being moved forward to enter the hole in the film, then to be moved downwardly in a substantially straight line to feed the film, then to be moved directly out of and away from the film and then to be moved upward in a substantially straight line to the level at which it then proceeds forward again to engage the film. The rear end of the claw arm 45 is shown bifurcated at 55, to slide on a pin 56 because of the back and forth movement of the arm. This pin 56 projects upwardly from a plate 57 shown in Fig. 8 which plate is pivoted on a pin 58 disposed in a suitable hole 59 in a wall of the camera casing 10. This plate is provided with a curved slot 60 in which rides a pin 61 fastened to the camera wall. This curved slot with the pin 61 permits the plate to be adjusted at will by unloosening and tightening the pin 61 so as to slightly vary the position of pin 56 and consequently to vary the theoretical pivotal point of the rear end of claw arm 45.

The gear 36 also meshes with a gear 62 which in turn meshes with a gear 63. This gear 63 is mounted on a shaft 64 carrying a five-pointed cam 65. The points of this cam are adapted, as shown in Fig. 3, to come in contact with the lateral bevelled end 66 of a spring plate 67. This spring plate is fastened to the front wall of the chamber 12 and the lateral bevelled end projects through a slot therein. Engagement of the high points of the cam 65 with this bevelled end forces the spring back and thus withdraws a registration pin 68 from engagement with the holes in the film since this registration pin is mounted on a plate 69 fastened to the spring plate 67. The operation of the claw arm 45 and the cam 65 are so timed that the registration pin 68 is withdrawn just before the claw 43 engages the film to feed it downwardly past the opening 24. The cam 65 has slots 70 therein in which ride pins 71 fastened to the side of the gear 63 so as to permit angular adjustment of the cam and thereby enable its timing to be regulated.

The gear 63 meshes with a gear 72 mounted on a shaft 73 carrying a split cylindrical shutter 27'. This shutter is located between the aperture 24 and the lens combination unit 26.

The shaft 53 also carries a gear 75 meshing with a gear 76 on a shaft 77. This shaft also carries a gear 78 meshing with a gear 79 on shaft 80. This shaft carries centrifugal governor elements 81 connected to a plate 82 slidable along the shaft 80 as the speed of the elements increases. Adjacent this plate 82 there is disposed a flexible arm 83 on the opposite end of which is mounted a brake pad 84 adjacent one face of the plate 82, see Fig. 5. The lower end of the plate 83 preferably is fastened to the camera casing. The intermediate portion of the brake arm 83 is connected to a threaded shaft 85. This shaft is threadably mounted in a plate 86 disposed in the wall of the casing and on its outer end is provided with a turnable dial 87, the turning of which threads the shaft 85 forward or backward a sufficient amount to draw the brake pad 84 to the plate 82 or to move it further therefrom. This dial 87 is shown in Fig. 1, and by being turned will, therefore, dispose the pad 84 so as to brake against the plate 82 and limit the magazine speed of the driving motor so that if the speed of movement of the film is to be regulated at 16 sections per second, the pad 84 will be moved further away from the plate 82. If the speed is to be limited the dial 87 is moved accordingly and the pad 84 is moved closer to the plate 82 so as to brake the speed.

The invention also includes a means for automatically stopping the feeding of the film after a predetermined footage or length thereof has been exposed. This means comprises a dial 88 associated with a scale 89 on the outside of the casing, as shown in Fig. 2. The dial is calibrated in terms of feet of film, and by setting the dial opposite a given mark on the casing and by turning the dial any given portion, this will turn the cam plate 90, see Fig. 6 to any particular position. The dial on its inner face is provided with a pawl 92 which is preferably mounted on the sleeve 91 and adapted to rotate over a ratchet 93 on a plate 94 rotatable against the front face of the casing and rigidly fastened to a rotatable ratchet sleeve 95. Therefore, the dial 88 can be moved to set the dial for the number of feet of film to be exposed.

The ratchet sleeve 95 shown also in Fig. 4, will be fed by engagement therewith of counting pawls 96 and 97 disposed on opposite sides of the counting ratchet 95 connected to and disposed as bifurcated arms mounted eccentrically around a shaft 98 on which the spring motor casing 32 is disposed. As this spring motor turns with its shaft these counting pawls will be eccentrically driven to turn the counting ratchet 95. The turning of this ratchet through rack-and-pawl elements 92 and 93 above-mentioned will also turn the dial 88 and with it the cam 90. The cam 90 is provided with a high point 99. With the surface of this stop cam 90 the end 100 of a bell crank lever is engaged. This lever is connected to the camera at 101. The other end 102 of this lever lies adjacent the end of a starting lever 103 connected at 104. The upper end of this starting lever has a depression 105 therein adapted to receive the end of a spring 106 fastened to the camera casing. This spring tends to hold the stop lever in a normal position. The upper end of this lever 103 is provided with a button 107 projecting through the wall of the camera casing and adapted to ride in a slot 108 whereby it can be moved forward or backward from the normal position shown in Fig. 4. When the button is moved forward toward the front of the camera it will be seen that an upturned flange 109 on its lower end is moved out of the way of a stop pin 110 disposed on the adjacent face of the gear 75 so that the gear under the influence of the spring motor can move and feed the film but at the same time the lower end portion 111 of this lever is moved to a position so that when the pin 110 comes around again the gear will be stopped and the film also. This forward motion of the button 107 is calculated to permit the taking of one picture. By movement of the button 107 backwardly from the normal position the flange 109 is moved forward out of the way of the pin 110 and this allows continuous movement of the drive mechanism until the lever 103 is allowed to resume its normal position.

Assuming that the pin is moved backward to permit continuous motion of the film and that the dial 88 has been set to automatically run 40 feet then the setting of the stop cam 90 is such that when the counting ratchet is moved the distance corresponding to the feet of 40 of the film the high point 99 of the cam 90 will raise the lower end 100 of the lever and cause the upper end 102 to move backward against the lower end of the stop cam lever 103 moving it backward sufficiently to dispose the stop flange 109 in front of the pin 110 and thus stop the mechanism. Therefore, this arrangement in general permits the exposure of a single picture, and also permits continuous movement of the film, as well as automatically providing for the running of a predetermined length of film less than the entire length thereof with automatic stoppage of the mechanism when the predetermined amount of film has been passed through the camera.

In summation, it is to be noted that the magazine is inserted in the recess and as the door is closed the end of the lateral springs will assist in holding the magazine in desired alignment. The wide curvature of the corners of the magazine will permit the effective operation of the release button 18. The registration of the projection 29 with the groove 30 in the magazine will permit only the proper kind of magazine to be inserted. The spring 20 will force the magazine forward to move the film to picture taking alignment with the proper plane respecting the lens combination 75.

The spring motor casings 31 and 32 are made effective by the operation of the starting pin. These casings are geared together in series and are of sufficient force and stored power as to uniformly drive the gearing under control of the centrifugal governor and having a much greater power capacity than is necessary to drive the maximum amount of film which can be used in this camera. Thus the film feeding mechanism is always driven by a steady force. The maximum speed can be predetermined by adjusting the brake arm 83 through the setting of the speed dial 87. The amount of film to be run can be regulated automatically by setting the dial 88 which will cause the stopping of the drive as soon as the noted amount of film has passed the aperture 24. The forward movement of the starting button will insure that only one picture is taken because of the provision of one stop flange on the starting arm to permit the movement of the gears is immediately counterbalanced by the interposition of another obstacle or stop in the path of the pin. The relation of the gears is such that for one revolution of the gear 75 only one film section passes the aperture 24.

The foregoing constriction gives a simple, compact, durable device of such size and thickness as to make it of relatively diminutive size and yet is provided with every reasonable mechanism to insure practical every-day operation. It also provides such an accurately designed and manufactured apparatus as will give steady, uniform feeding of the film and alignment of it with the lens so that there will not be danger of nonalignment within the machine. It is operated with a minimum amount of effort and requires a minimum amount of skill on the part of the person using it.

While the invention has been described in detail and with respect to a present preferred form thereof it is not to be limited to such details and forms since many changes and modifications may be made in the invention without departing from the spirit and scope of the invention in its broadest aspects. Hence it is desired to cover any and all forms and modifications of the invention which may come within the language or scope of one or more of the appended claims.

What is claimed, is:

1. In a motion picture camera, a driving motor, a gearing device driven thereby, a starting lever having a normal and two abnormal positions, cooperating means on the lever and the gearing to stop the movement when the lever is in normal position, said gearing adapted to move when the lever is moved to either of the two abnormal positions, means on the lever to stop the gearing after one cycle of movement when the lever is moved to one abnormal position, a cam driven by the gearing, means for adjustably setting the cam in any one of a plurality of positions, and a stop lever cooperating with the cam and moved thereby, said stop lever adapted to be moved by the cam to engage with and return the starting lever to normal position at a predetermined time after it has been moved to the other abnormal position.

2. In a motion picture camera, a driving motor, a gearing driven thereby, a starting lever having a normal and two abnormal positions, cooperating means on the lever and the gearing to stop the movement when the lever is in normal position, said gearing adapted to move when the lever is moved to either of the two abnormal positions, means on the lever to stop the gearing after one cycle of movement when the lever is moved to one abnormal position, an adjustable cam driven by the gearing, and means operated by the cam to engage with and move the starting lever back to normal position after it has been moved to the other abnormal position.

3. In a motion picture camera, a driving motor, a gearing driven thereby, a starting lever having a normal and two abnormal positions, cooperating means on the lever and the gearing to stop the movement when the lever is in normal position, said gearing adapted to move when the lever is moved to either of the two abnormal positions, means on the lever to stop the gearing after one cycle of movement when the lever is moved to one abnormal position, a cam driven by the gearing, means to adjust and pre-set the high point of said cam, a stop lever having one end engageable with said cam, the other end of the stop lever being disposed near the lower end of the starting lever, said upper end of the stop lever adapted to be moved by the action of the cam to engage with and move the starting lever back to normal position after the starting lever has been moved to the other abnormal position.

4. In a motion picture camera, a driving motor, gearing driven thereby, a detent on said gearing, a starting lever having a normal and two abnormal positions, a stop lug on said lever in the path of the detent when the lever is in normal position, a second stop lug on the lever in the path of the detent when the lever is moved to one abnormal position, said lugs being moved entirely out of the path of the detent when the lever is moved to the other abnormal position, an adjustable cam driven by the gearing, and means operated by the cam to engage with and move the starting lever back to normal position after it has been moved to the other abnormal position.

5. In a motion picture camera, a driving motor, gearing driven thereby, a detent on said gearing, a starting lever having a normal and two abnormal positions, a stop lug on said lever in the path of the detent when the lever is in normal position, a second stop lug on the lever in the path of the detent when the lever is moved to one abnormal position, said lugs being moved entirely out of the path of the detent when the lever is moved to the other abnormal position, a cam driven by the gearing, means to adjust and pre-set the high point of the cam, a stop lever having one end engageable with said cam, the other end of the stop lever being disposed near the lower end of the starting lever, said upper end of the stop lever adapted to be moved by the action of the cam to engage with and move the starting lever back to normal position after the starting lever has been moved to the other abnormal position.

6. In a motion picture camera, a driving motor, a gearing driven thereby, a stop mounted on one portion of said gearing, a lever mounted in said camera and having a portion extending outside of said camera for moving said lever into two abnormal positions, said lever being pivoted near its central part, a first stop lug on said lever adapted to engage the stop on said gearing to maintain the gearing inoperative and adapted to be moved out of engagement with said gearing stop when said lever is pivoted in one direction to thereby permit the taking of continuous moving pictures, a second stop lug on said lever adapted to be engaged by said stop on the gearing after said first stop lug has been moved out of contact with said stop on the gearing to permit the taking of a single picture, said lever being moved about its pivot in the opposite direction to its first movement to allow the taking of the single picture.

7. In a motion picture camera, a driving motor, gearing driven thereby, a stop operatively connected with said gearing, a single lever pivotally mounted adjacent a wall of the camera for swinging in a plane parallel to said wall, and having a portion extending outside of said camera, said lever having a plurality of lugs adapted to engage said stop under predetermined conditions, one of said lugs engaging said stop to prevent motion of the gearing in one position of the lever, and said lever being adapted to be swung into another position in which said lug lies out of engagement with said stop and in which the other lug lies in a position for engaging said stop following one rotation of the same, thereby permitting the taking of a single picture, and said lever being adapted to be swung into a third separate position wherein both of said lugs lie out of the path of said stop to enable the taking of a continuous series of pictures.

EDWIN STANTON PORTER.